No. 761,164. PATENTED MAY 31, 1904.
W. E. GREENAWALT.
PROCESS OF EXTRACTING METALS FROM ORES.
APPLICATION FILED OCT. 30, 1903.
NO MODEL.
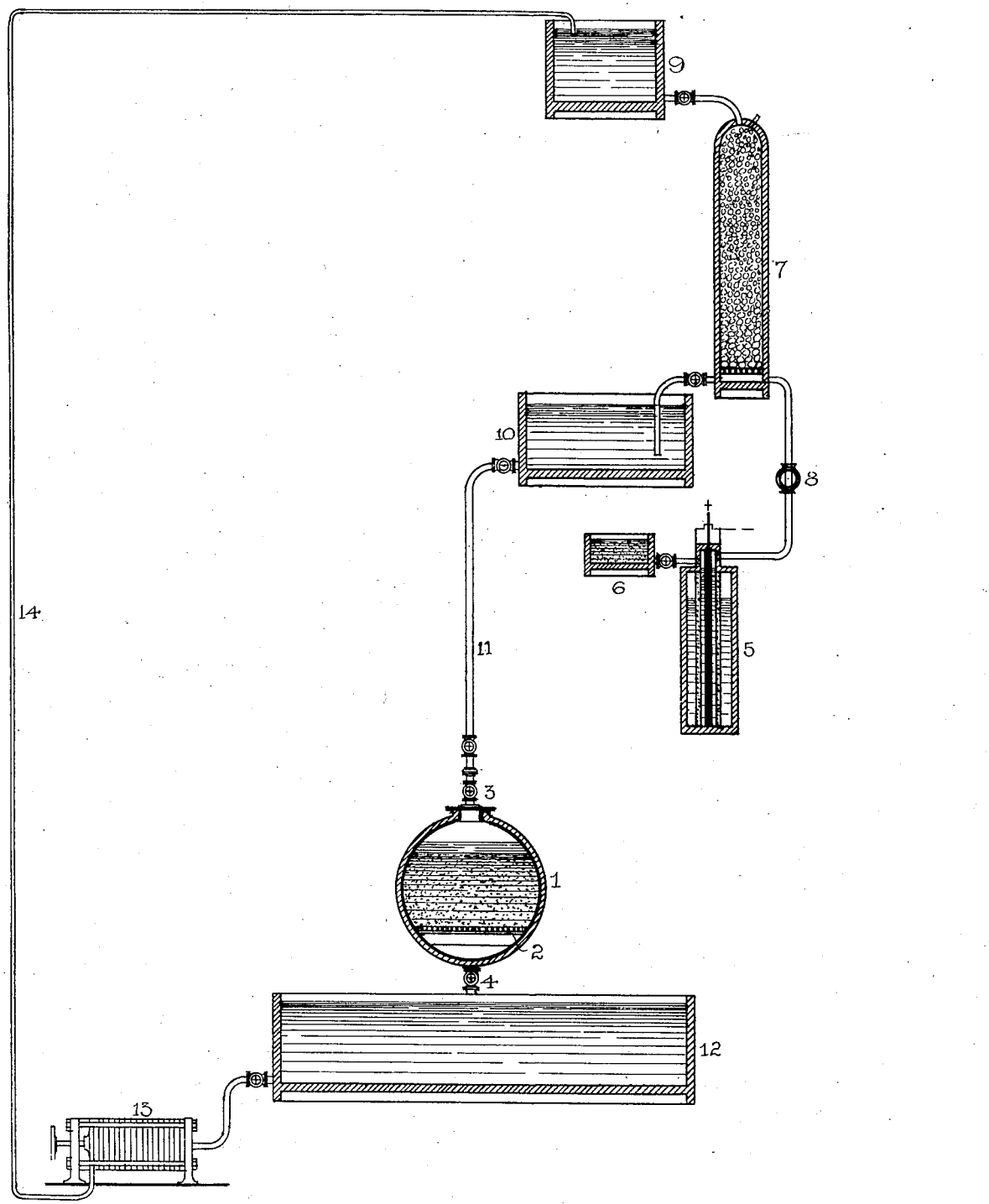

No. 761,164. Patented May 31, 1904.

UNITED STATES PATENT OFFICE.

WILLIAM E. GREENAWALT, OF DENVER, COLORADO.

PROCESS OF EXTRACTING METALS FROM ORES.

SPECIFICATION forming part of Letters Patent No. 761,164, dated May 31, 1904.

Application filed October 30, 1903. Serial No. 179,181. (No specimens.)

*To all whom it may concern:*

Be it known that I, WILLIAM E. GREENAWALT, a citizen of the United States, residing at Denver, in the county of Denver and State of Colorado, have invented certain new and useful Improvements in Processes of Extracting Metals from Their Ores; and I do declare the following to be a full, clear, and exact description of the invention, such as will enable others skilled in the art to which it appertains to make and use the same, reference being had to the accompanying drawing, and to figures of reference marked thereon, which forms a part of this specification.

My invention relates to improvements in processes of extracting metals from their ores by the use of chlorin solutions. It refers more particularly to the application of chlorin as generated by electrolysis to the reduction of gold ores by what is known as the "barrel" process.

It is rarely that gold ores are so well adapted to chlorination that they can thoroughly be treated by one application of a chlorin solution made under ordinary atmospheric pressure. Most of the chlorin so absorbed is almost instantly consumed by the base elements in the ore, so that none or only a small portion remains to act on the gold. The action on gold with solutions so dilute is very slow and unsatisfactory. Recharging the barrel with fresh solution is therefore necessary. The difficulty, however, by the ordinary method of filtering and recharging is the time consumed.

My object in this invention is to charge the barrel with ore and solution, then after much or most of the chlorin has been consumed by satisfying the base elements displacing the old solution with a fresh quantity of new solution, which can then confine its action on the precious metals.

The accompanying drawing illustrates an apparatus well adapted to the carrying out of my process, in which—

1 is a chlorination-barrel with a filter 2 at the bottom of the barrel.

3 is an inlet and 4 an outlet valve for the solutions.

5 is an electrolytic cell for generating chlorin from salt.

6 is a salt-tank supplying brine to the cell.

7 is a scrubbing-tower in which the chlorin generated in the cell is absorbed in aqueous solution.

8 is an exhauster which exhausts the chlorin from the cell and delivers it to the scrubbing-tower.

9 is a water-supply tank, and 10 is a storage-tank where the chlorin solution is at all times ready for use.

12 is a precipitating-tank.

13 is a filter-press, and 14 a pipe to return the solution for reuse, if desired.

To facilitate the operation, the storage-tank 10 is preferably so located as to give considerable pressure in the barrel.

To operate the process, salt water is introduced into the positive compartment of the cell 5. The electric current is then turned on, and by the familiar decomposition of the salt chlorin is liberated in the positive compartment, while caustic soda and hydrogen are liberated in the negative compartments. The chlorin is exhausted from the cell by the exhauster 8 and conveyed into the scrubbing-tower 7, where coming in contact with water in a state of subdivision a saturated solution of chlorin is obtained, which flows into storage-tank 10, where it is at all times ready for use. The barrel is then charged with ore and solution and revolved for a short time—say about one hour. The time will depend largely on the nature of the ore. It is then stopped, the storage-tank again connected with the barrel through the conduit 11, and the valve 4 is opened. The fresh solution under pressure will then quickly replace the old solution, which is allowed to flow into the precipitating-tank. After the old solution is displaced by the fresh solution the valves are again closed, the conduit 11 disconnected, and the barrel again revolved long enough to effect the necessary degree of extraction. The final solution is then filtered from the ore by any of the usual methods and precipitated. The precipitated solution is then passed through the filter-press, where the precipitate is caught. The filtrate may then be wasted or returned for resaturation and reuse.

Having thus described my invention, what I claim is—

A process of extracting metals from their ores comprising electrolyzing sodium chlorid for the purpose of generating chlorin, absorbing the chlorin so generated in aqueous solution, charging the solution and the ore to be treated into a closed vessel, agitating it for some time, then introducing fresh solution under pressure thereby displacing the first solution, again agitating the contents of the vessel, then filtering the solution from the ore and precipitating the desired metals.

WILLIAM E. GREENAWALT.

Witnesses:
J. W. GIBBS,
CHAS. H. SMITH.